United States Patent [19]

Guthrie et al.

[11] 4,377,645

[45] Mar. 22, 1983

[54] DIMENSIONALLY-STABLE POLYURETHANE SPONGE AND SPONGE-FORMING PREPOLYMER

[75] Inventors: James L. Guthrie, Ashton; Suze E. Arquette, Columbia, both of Md.

[73] Assignee: W. R. Grace & Co., New York, N.Y.

[21] Appl. No.: 314,537

[22] Filed: Oct. 26, 1981

Related U.S. Application Data

[63] Continuation-in-part of Ser. No. 220,562, Dec. 29, 1980.

[51] Int. Cl.$^3$ .................... C08G 18/14; C08G 18/48; C08G 18/79
[52] U.S. Cl. .................... 521/137; 521/160; 521/901; 521/905; 521/914
[58] Field of Search ............... 521/137, 905, 160, 901, 521/914

[56] References Cited

U.S. PATENT DOCUMENTS

| | | | |
|---|---|---|---|
| 3,806,474 | 4/1974 | Blair | 521/905 |
| 4,102,831 | 7/1978 | Osgood | 521/137 |
| 4,160,076 | 7/1979 | Guthrie et al. | 521/905 |
| 4,201,846 | 5/1980 | Kehr et al. | 521/137 |
| 4,292,412 | 9/1981 | Wood | 521/905 |
| 4,309,509 | 1/1982 | Wood | 521/905 |
| 4,314,034 | 2/1982 | Fulmer et al. | 521/65 |

FOREIGN PATENT DOCUMENTS

874430 8/1961 United Kingdom .
1209058 10/1970 United Kingdom .

OTHER PUBLICATIONS

The Upjohn Co., Tech. Service Report–Isonate 143L "Liquid MDI", Feb. 1980.
The Upjohn Co., Technical Information–"PAPI94".

*Primary Examiner*—H. S. Cockeram
*Attorney, Agent, or Firm*—Richard P. Plunkett; Edward J. Cabic; William W. McDowell, Jr.

[57] ABSTRACT

An MDI based polyurethane foam having cellulose foam properties is produced by mixing together an aqueous phase which can optionally contain reinforcing fibers and surfactants and a resin phase comprising a prepolymer derived from a poly(oxy $C_{2-4}$ alkylene)diol, an MDI containing isocyanate product having a functionality greater than 2.0 made of a mixture of MDI and isocyanate containing derivatives of MDI, and a monomeric polyol cross-linking agent having 3 or 4 hydroxyl equivalents per mole. The preferred polyol is trimethylolpropane and the preferred diol is Carbowax 1000. The diol and the polyol, such as trimethylolpropane, are present in a mole ratio in the range of 4:1 to 8:1 while the ratio of the isocyanate equivalents to the total hydroxyl equivalents is in the range of 3:1 to 4:1. The isocyanate containing product comprises more than 50% by weight of the prepolymer and Isonate 143L is the preferred isocyanate product. The foam has a minimal swell when wet and it does not curl upon drying.

16 Claims, No Drawings

DIMENSIONALLY-STABLE POLYURETHANE SPONGE AND SPONGE-FORMING PREPOLYMER

CROSS-REFERENCE TO RELATED APPLICATION

This application is a continuation-in-part of U.S. application Ser. No. 220,562 filed Dec. 29, 1980.

BACKGROUND OF THE INVENTION

1. Field of the Invention

This invention relates to a polyurethane prepolymer and the resulting sponge that can be made from the prepolymer which has the general appearance and wiping characteristics of a cellulose sponge, with minimal swelling when wet and with the property of not curling during drying.

2. Description of Previously Published Art

It has long been a goal of the sponge industry to substitute polyurethane foam for cellulose foam for use in wiping sponges or in sponge-based composites such as scrubbing pads or bathmats. In general, polyurethane foams of the previous art which are hydrophilic enough to be useful, tend to swell greatly when they are wet such as on the order of more than 75–100% by volume. They dry slowly and nonuniformly, causing curling or cockling as they dry. This property is objectionable for household sponge use. It has been proposed to use polyurethane foams as the substrate for flocked wall coverings. However, in view of the curling and cockling properties of these foams and the resulting buckling that occurs, these foams are unfit, to be used as the substrate for flocked wall coverings.

In U.S. Pat. No. 3,806,474, a hydrophilic polyester urethane foam is disclosed. However, this foam does not wet out rapidly and it does not wipe so as to leave a clean surface.

In U.S. Pat. No. 4,160,076, a simulated natural sponge based on hydrophilic polyurethane is disclosed. However, even though this simulates a natural sponge, it still has the problem of polyurethane sponges that it swells greatly when it is wet.

Conventional polyurethane foams have been made from MDI which is methylene-bis (phenyl isocyanate). These foams are rigid or semi-rigid because MDI imparts crystallinity. They are generally hydrophobic because MDI itself is hydrophobic. In British Pat. No. 874,430, flexible polyurethane foams are produced by reaction of polyether polyols with at least two hydroxyl groups and a polyisocyanate mixture consisting of diarylmethane diisocyanates and 5 to 10 percent by weight of a polyisocyanate having a functionality greater than 2 in the presence of a small amount of water. A catalyst can be used in optional embodiments. These foams have the disadvantages that they are not hydrophilic and are not made with sufficient quantities of water to allow transport of large amounts of fibers, fillers, antiseptics, or other water-soluble or water-dispersible components into the foams and in the case of the optional catalyst there can remain catalyst residue which is not desirable.

In U.S. Pat. No. 4,237,240, flexible MDI-based foams with high load-bearing and high energy-absorption capacity are made by reaction of diphenylmethane diisocyanates with polyester polyols or mixtures of polyester polyols and polyether polyols with a polyester polyol content of at least 60 percent by weight of the polyol mixture, and small amounts of water. As set forth in the claims, a catalyst is employed. These foams have the same drawbacks as those of the above-described British Pat. No. 874,430 including the undesirable catalyst residues in the foam and in addition they require the use of the more expensive polyester polyols.

In British Pat. No. 1,209,058, flexible hydrophilic polyurethane foams can be made by reacting a polyisocyanate with polyether polyols which contain at least 10% by weight of a block copolymer of ethylene oxide capped with propylene oxide to obtain hydrolytic stability. The method requires using at least one divalent tin salt of a fatty acid and/or at least one tertiary amine as a catalyst. The foam products made by this method, while being hydrophilic, have the drawback of being made with only small amounts of water. Moreover, there is no teaching of the use of MDI, which is hydrophobic to make hydrophilic foam products and the resulting foam will contain undesirable catalyst residues.

OBJECTS OF THE INVENTION

It is an object of this invention to provide an improved polyurethane foam with a density of 2–4 lb/ft$^3$, with good water-holding and wiping ability, but which dries quickly without curling and which shrinks less than 15% by volume.

It is a further object of this invention to provide an improved polyurethane foam with good dimensional stability which can be used for sponge use as well as a substrate for flocked wall coverings or for various other foam applications.

It is a further object of this invention to produce a polyurethane prepolymer which when mixed with water will produce a foam having properties similar to cellulose based foams.

These and further objects will become apparent as the description of the invention proceeds.

SUMMARY OF THE INVENTION

A new polyurethane prepolymer has been made derived from a poly(oxy C$_{2-4}$ alkylene) diol having at least 50% by weight oxyethylene groups, a diphenylmethane diisocyanate-containing isocyanate product having a functionality greater than 2.0 comprising a mixture of MDI and isocyanate containing derivatives of MDI, and a monomeric polyol cross-linking agent having a hydroxy functionality of 3 or 4. This prepolymer can react with water in the absence of a catalyst to produce a durable polyurethane sponge having many of the characteristics of a cellulose sponge. These foams are white in color and are thus aesthetically pleasing and desirable for medical and health care applications.

The preferred components include a diol having greater than 80% by weight of oxyethylene groups such as Carbowax 1000, trimethylolpropane (TMOP) as the cross-linking agent and as the isocyanate Isonate 143L, which is a methylene-bis(phenyl isocyanate), hereinafter MDI, based isocyanate product of Upjohn Polymer Chemicals having a functionality of approximately 2.1.

In the preferred formulation the Carbowax, a poly(oxyethylene) diol product of Union Carbide, is used to impart the water-absorbing property to the finished product. The preferred TMOP is added to provide strength to the foam product through its action as a cross-linking agent. It is important to have the molar ratio of the diol (such as Carbowax) to the monomeric polyol cross-linking agent (such as TMOP) be approximately in the range of 4:1 to 8:1 and preferably about 6:1. Similarly, the ratio of isocyanate equivalents to hydroxyl equivalents in the prepolymer should be in the range of about 3–4:1 and more preferably in the range of 3.3–3.7:1.

The isocyanate containing product should be more than 50% by weight of the total prepolymer and it should have a functionality greater than 2.0. This would exclude pure MDI which has a functionality of only 2.0 as the only isocyanate. The use of Isonate 143L as the preferred isocyanate source is desirable because it contains dimer, trimer, and carbodiimide components which increase the functionality to a level of greater than 2.0 and which are believed to contribute to the storage stability of the prepolymer and to the strength and dimensional stability of the foam.

The actual content of free MDI can be adjusted up or down in this isocyanate containing product so long as the functionality remains greater than 2.0. For example, additional pure MDI could be added.

To further improve the durability of the sponge, relatively short fibers of about ⅛ inch or less in an amount of about 10% or less are added to the aqueous suspension. Preferable fibers are polyester fibers. In order to be able to pump the mixture through foam-forming machines, a thickening or suspending agent can be added to the aqueous phase. For example, Carbopol 941 which is a high molecular weight acrylic acid polymer can be added and it can be neutralized to a pH 7 level with a base such as ammonium hydroxide.

The sponge foam is made by reacting the prepolymer with water, preferably while both are heated. Surfactants may be added to the water to control the foam cell characteristics.

DESCRIPTION OF THE PREFERRED EMBODIMENT

The preferred isocyanate containing product having a functionality greater than 2.0, is a mixture of diphenylmethane diisocyanate, abbreviated MDI, and isocyanate containing derivatives of MDI. One commercial product meeting this requirement is Isonate 143L which is produced by reacting MDI to form a carbodiimide and this material in turn then reacts to form a tri-functional cycloadduct. The mixture of MDI, the carbodiimide and the cycloadduct are in equilibrium. The mixture contains a major amount of pure diphenylmethane diisocyanate and minor amounts of carbodiimides and trifunctional cycloadducts of diphenylmethane diisocyanate. A mixture of the A and B components below constitute the 143L system.

A

OCN—R—NCO ⟶ [OCN—R—N=C=N—R—NCO]

B
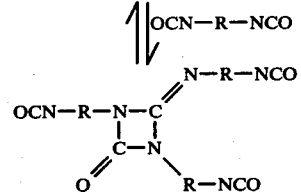

where R = 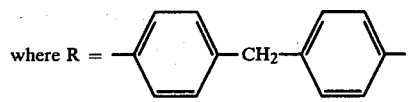

As used herein the term derivatives of diphenylmethane diisocyanate means products that have been made from MDI as a starting material. It would include adducts, dimers and trimers. It would not include materials such as polymethylene polyphenylisocyanates which are not made from MDI.

The diol used in making the prepolymer is a poly(oxy $C_{2-4}$ alkylene)diol having at least 50% by weight oxyethylene groups and preferably at least 80% by weight oxyethylene groups. Thus when the diol contains oxypropylene or oxybutylene or mixtures thereof, there must also be present this minimum amount of oxyethylene. The preferred diol has at least 80% by weight of oxyethylene groups and is a hydrophilic poly(oxyethylene) diol made by Union Carbide under the product name Carbowax. When using Isonate 143L as the sole isocyanate source it is preferred to use Carbowax at a molecular weight of about 1000. Other Carbowax formulations having a molecular weight from 600 to 1100 can be used, but the most preferred form has a molecular weight of 950 to 1050. It is this range of products which is produced when making the commercial grade of Carbowax 1000. If a lower molecular weight form than about 600 is used the resulting sponge made from the prepolymer will lose its hydrophilic nature because any sponge formulation would then require a larger amount of relatively hydrophobic Isonate. Similarly, if a higher molecular weight form of Carbowax than 1100 is used, the resulting sponge will lose its cross-link density and much of its dimensional stability and stiffness.

To provide cross-linking strength to the final foam product to be made from the prepolymer, a relatively short, low molecular weight monomeric polyol is added having 3 or 4 hydroxyl equivalents per mole. Examples are trimethylolethane, trimethylolpropane, glycerol, triethanolamine, pentaerythritol or mixtures thereof. The preferred polyol is trimethylolpropane, TMOP, which has the formula

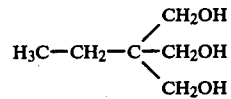

In making the prepolymer it is also desirable to control the ratio of the diol such as Carbowax to the shorter cross-linking polyol. In general the molar ratio should be in the range of about 4:1 to 8:1 with the preferred ratio being about 6:1. If the ratio is too low such that there is too much polyol, then the resulting sponge made from the prepolymer will lose its hydrophilic character and the foam also will have a poorer foam structure. On the other hand if the ratio is increased such that there is less polyol such as TMOP, then weak, flabby foams are obtained which are characterized by fine cells and partially closed cells. The molar ratios which are expressed for these two materials define the relative number of hydroxyl equivalents present from each material. Thus, at a ratio of 6 moles of the preferred diol Carbowax to 1 mole of the preferred polyol TMOP, the Carbowax contributes 12 equivalents of hydroxyl to 3 equivalents from the TMOP.

The Carbowax 1000 has an equivalent weight of 500 per hydroxyl group while TMOP with a molecular weight of 134 has an equivalent weight of 45 per hydroxyl group. Since the Isonate 143L is used to combine with the hydroxyl groups, the amount of Isonate required will be very sensitive to on the amount of TMOP and thus the amount of TMOP is relatively carefully controlled.

The ratio of the isocyanate to hydroxyl groups in the reactants should be in the range of 3–4 and more preferably from about 3.3 to 3.7. When the prepolymer is made, one isocyanate group of the polyisocyanate component reacts with a hydroxyl group to leave the remaining isocyanate group unreacted. These free isocyanate groups on the prepolymer then react with water to form polyurea linkages with simultaneous increase in molecular weight and the release of $CO_2$ which acids in forming the foamed sponge.

The isocyanate containing product should comprise more than 50% by weight of the prepolymer to provide the stiffness required for the sponge.

When reacting the components to form the prepolymer, it has been helpful to measure the isocyanate level by titration after the reaction has taken place for about one hour. From this reading and subsequent titrations one can determine the additional reaction time required to reduce the isocyanate level down to about the level which is the theoretical point at which all of the hydroxyl groups will have reacted with the isocyanate. If the reaction is permitted to continue for too much further so the isocyanate level is further reduced, then the prepolymer viscosity increases, making it more difficult to subsequently mix the prepolymer with water. Over reacting the prepolymer components will also cause the foam density to increase as well as to decrease the water absorptive property of the resulting foam.

Fibers are preferably added to the aqueous phase for insertion into the foam composition to provide sufficient structural rigidity. Polyester fibers are especially advantageous and they can be cut up into lengths of about ½ inch or less. With respect to the aqueous suspension the fibers can be added in various amounts although they preferably do not constitute more than about 10% by weight because above that level the suspension becomes too difficult to pump.

A high molecular weight suspending or thickening agent is added to serve two functions. First it keeps the ingredients suspended so the water does not drain out of the fibers and so that the fibers do not float. Secondly, the thickening agent acts as a lubricant for the fibers so they do not tangle, dewater and jam up when going through the mixing pump. Example of thickening agents are Polyox WSR, Natrosol, Xanthan gums, and polyacrylamides such as Dow's Separan AP30 which have high molecular weights of about one million or so.

Preferred suspending or thickening agents are the Carbopol resins made by the B. F. Goodrich Chemical Co. such as Carbopol 934, Carbopol 940 and especially Carbopol 941. Since the Carbopol resins are acrylic acid polymers with an acid moiety, a neutralizing agent such as sodium or ammonium hydroxide can be added. When adding ammonium hydroxide as the neutralizing agent to the Carbopol, there is an advantageous increase in viscosity of the aqueous phase. Also since ammonium hydroxide is less expensive then Carbopol, a more economical formulation having the same amount of thickening can be made which utilizes less Carbopol.

Some of the suspending or thickening agents may have surface active properties so they can also be a part of the surfactant system which controls the cell size of the resulting sponge.

Surfactants are chosen to give a foam with a good appearance that has the correct cell size, shape and lack of collapse or splits. Surfactants which are known to be useful in polyurethane foams may be employed here. Examples of preferred surfactants are the block copolymers of oxyethylene and oxypropylene such as the Pluronic Polyol surfactants manufactured by BASF Wyandotte Corp. of Wyandotte, Michigan. A preferred surfactant is Pluronic L-62.

In making the polyurethane foam the preferred procedure is to add about an equal amount of the aqueous suspension with the prepolymer mixture and to then mix the two together. The composition of the aqueous suspension can be also expressed on the basis of 100 parts of prepolymer resin. Thus, 100 parts of water per 100 parts of resin is written 100 phr water. The ratio of the amount of the prepolymer mixture to the aqueous suspension can vary over a wide range. However, if the amount of the aqueous suspension is too large, then the strength of the resulting foam drops. On the other hand if the amount of the aqueous suspension is decreased too much, then it will not be possible to add enough fibers and fillers which are supplied via the aqueous suspension.

The preferred method of foaming the prepolymer is to heat the aqueous suspension, for example, a 2% solution of Pluronic L-62 surfactant, as well as the prepolymer, to a temperature of approximately 35° C. These are poured or pumped together in a ratio of about 100 parts by weight of aqueous suspension to about 80 parts by weight of the prepolymer and stirred immediately for up to 15–30 seconds by a mechanical stirrer such as a blade attached to a drill motor. This length of time allows complete mixing but does not allow an appreciable degree of chemical reaction to occur. This mixture is poured immediately into a mold, where the rising and curing of the foam product takes place.

Depending on the fibers, pigments, thickeners, etc. which might be incorporated, the best surfactant might vary from a highly hydrophobic silicone type such as L-520 (Union Carbide) or other silicone surfactants to a very hydrophillic type such as Brij-58 (ICI-America) or the other Brij, Span, or Tween products from ICI. For general use, we prefer the nonionic surfactants such as the Pluronics, especially L-62, L-72, L-92, P-75 or P-85 (BASF-Wyandotte). The use of these surfactants would be familiar to one skilled in the formulation of polyurethane foam products.

These foams, depending on the conditions of foaming, may have an advantageous structure like the SEA SPONGE ® disclosed in U.S. Pat. No. 4,160,076. That sponge has the appearance and wiping characteristics of cellulosic sponges. It has large cells (pores) which are several millimeters in diameter, but the walls of these cells are perforated with a large number of pinholes. This gives the sponge a high degree of strength and stiffness, because of the the thick cell walls, but excellent ability to wick and absorb water through capillary action of the perforations. It is different from other flexible urethane foams which are classed either as fine-celled (smooth) or reticulated. Reticulated foams have most of the cell membranes removed so that they have a fibrous appearance. They are used as filters in furnaces and air conditioners. The SEA SPONGE® foams and the foams of this invention, by contrast, have the cell membranes intact but perforated. They differ also from the familiar polyurethane sponges on the market because they will absorb water into the polymer itself and will wipe dry. Conventional urethane sponges repel water and do not wipe smooth surfaces dry.

Having described the basic aspects of our invention, the following examples are given to illustrate specific embodiments thereof.

Tests Used in Evaluating the Sponges

The following test procedures were utilized. All the foam samples to be tested were cut in the dry state to a uniform 1"×3"×5" size and dried to a constant moisture-free weight at 105±5° C. The samples were weighed to the nearest 0.1 gram. Groups of 10 representative samples were used for the tests.

A. Wet-Out Time From Dry State

In a pan filled with water, the bone-dry foam is floated on the surface. The time is recorded in seconds required for the entire sample to wet out; that is, when water appears and wets the entire top surface of a sample.

B. Wet-Out Time From Wet State

The foam is thoroughly wetted out and passed through a washing machine wringer to obtain a uniform dampness. The damp foam is floated on the surface of a pan filled with water. The time is recorded in 0.1 seconds that is required for the entire sample to wet out.

C. Determination of Washing Machine Durability

After drying the 1"×3"×5" samples for one hour at 105° C.±5° they are weighed to ±0.02 grams. In a Maytag type, vertical washing machine filled with water are placed 48 samples and they are agitated for 72 hours. The samples are dried and reweighed.

$$\% \text{ Wt. Loss} = \frac{(\text{Original dry wt.} - \text{final dry wt.}) \times 100}{\text{Original dry weight}}$$

Even if a foam does not survive in one piece for the 72 hour period, it may still be satisfactory for the use as a sponge or for other foam applications because this test is a very severe test. If the sponge did not survive the 72 hour period, then the results are reported for the observed time period in hours at which time visible deterioration could be observed.

D. Determination of Tear Strength

The 1"×3"×5" samples are split in the 1"×3" plane for a distance of 2½". The jaws of a Scott Tester, Model J-1 (or equivalent), are set to a one-inch opening between the upper and lower jaws. One of the split sections is clamped to each of the jaws of the Scott Tester. The Tester is activated and tear resistance in pounds is recorded.

E. Determination of Failure Stress

An Instron Tester, equipped with jaws for testing sponge or similar materials, is used to determine the tenacity. The jaws of the Instron Tester are set to a one-inch opening between the upper and lower jaws. The three-inch dimension in each jaw is clamped and the Tester is activated. The tenacity in pounds is recorded. This value is converted to pounds per square inch by dividing the tenacity by the width of jaws in contact with the sample.

F. Determination of Air Permeability

The testing device used consists of a fan connected to a tube with a portion of the sample placed over the end of the tube. The air pressure on the upstream side of the sponge is measured. The air pressure gauge is calibrated so that if the material is impervious the reading is 0.60. If the reading is zero, then there is very little pressure drop across the sponge indicating a very high porosity and a very open cell structure.

G. Modulus

This is measured from the stress-strain curve at 1% elongation.

EXAMPLE 1

This example illustrates the preparation of a prepolymer to be used according to the invention.

A mixture of Carbowax 1000 (412 g., 0.4 mole) and trimethylolpropane (9.05 g., 0.0675 mole) were dried by heating for two hours at 70° C. under a reduced pressure of 2 Torr. To the dried and degassed polyol mixture was added 507.5 g. of Isonate 143L (3.55 equivalents of isocyanate). The temperature was maintained at 70° C. for 2½ hours, after which time the isocyanate content of the product was found to be 2.67 milliequivalents per gram. The prepolymer weighed 928 g. It had an initial viscosity at 25° C. of 19,000 cp. After a storage test for two weeks at 80° C., the viscosity had increased only to 30,000 cp.

EXAMPLE 2

This examples illustrates the production of a foam according to the present invention using the prepolymer of Example 1.

To a beaker were added 700 g. of prepolymer heated to 35° C. and 686 g. of an aqueous solution heated to 35° C. and containing 14 g. of Pluronic L-62, a nonionic surfactant from Wyandotte. They were stirred together fifteen seconds with a drill motor and then poured into a mold. The dried foam product had a density of 2.1 pounds per cubic foot.

A sponge with the approximate dimensions of 1"×3"×5½" was cut from the foam block. When saturated with water, it held 8–9 times its weight of water without dripping and the volume had increased from 16.8 cubic inches to only 18.8 cubic inches (12% increase). When squeezed by hand it released all but about 90% of its dry weight of water. It had the approximate appearance and wiping properties of a cellulose sponge of the same size.

EXAMPLE 3

This prepolymer was made using the same reactants and conditions as in Example 1, except that the reaction was stopped after the product had an isocyanate content of 2.61 milliequivalents per gram.

EXAMPLE 4

This prepolymer was made using the same reactants and conditions as in Example 1, except that the reaction was stopped after the product had an isocyanate content of 2.70 milliequivalents per gram.

EXAMPLES 5 & 6

These examples illustrate the effect of using the prepolymers of Examples 3 and 4 and of adding reinforcing fibers.

In Example 5, 700 g. of the prepolymer of Example 3 was mixed with an aqueous solution containing 686 g. of water and 14 g. of the surfactant Pluronic L-62. The results are set forth in Table 1 below.

In Example 6, 700 g. of the prepolymer of Example 4 was mixed with an aqueous solution containing 683.2 g. water, 14 g. of the surfactant Pluronic L-62, 35 g. of Polyester Fiber 2 which are ¼ inch fibers made by Mini Fibers, Inc. of Weber City Virginia, 2.8 g. of the thickening agent Carbopol 941 which had been neutralized with 7.0 g. of a 33% solution of ammonium hydroxide. The results are also set forth in Table 1.

TABLE 1

| Example | 5 | 6 |
|---|---|---|
| Properties | | |
| Density Lbs./ft.$^3$ | 2.13 | 3.91 |
| Wet Out Times | | |
| Dry State Sec | 600 | 600 |
| Wet State Sec | 300 | 177.2 |
| % Volume Swell | 11.8 | 10.3 |
| Washing Machine Durability (Hrs.) | 24–31 | 72 (0.00% wt. loss) |
| Tear | | |
| Dry Lbs/3" Width | 5.5 | 27.4 |
| Wet Lbs/3" Width | 3.1 | 13.2 |
| Dry | | |
| Modulus, psi | 23 | 50 |
| F Stress, psi | 9 | 24 |
| F Strain, % | 108 | 78 |
| Wet | | |
| Modulus, psi | 6 | 25 |
| F Stress, psi | 6 | 17 |
| F Strain, % | 148 | 135 |
| Air permeability, Cm H$_2$O | 0.45 | 0.06 |

The product of Example 5 contained only water and surfactant from the aqueous phase. These sponges had unusual properties. They had a well developed, uniform SEA SPONGE® type structure as well as brilliant white color. The density was a very low value of 2.13 lb/ft$^3$. When this sponge is dry it may be stiff depending on ambient conditions, but it is soft when wet. Although the initial wetout time is relatively long, it is highly absorbent when wet. The sponge can hold a large amount of water, scrub well, wipe well, and has a moderate washing machine durability value. Air permeability is moderate, while the volume swell is very low. This sponge has a good appearance and surface feel.

The samples from Example 6 are a fiber reinforced version of the foam of Example 5 containing Carbopol 941 and 5 phr fibers in the aqueous suspension used to make the sponge. This sponge was able to pass the very tough 72 hour washing machine test with 0% weight loss. Tear strength for both wet and dry conditions was high. There was very good air permeability, indicating an open cell structure. Although the cell structure may not be considered as aesthetically pleasing as the foam in Example 5, this foam does scrub well and it wipes satisfactorily. This is a very durable and tough sponge.

EXAMPLE 7

This example illustrates the production of the sponge foam without adding any surfactant to the water.

A foam made according to the procedure in Example 2 except that no surfactant was present in the water. The resulting hydrophilic foam had a density of 3 lb./cu. ft. and was similar to that in Example 2 except that it had a finer texture because of its smaller and partially closed cell structure.

We claim:

1. A foamed sponge having minimal swell when wet and which does not curl upon drying made by mixing together and reacting an aqueous phase and a resin phase comprising a prepolymer derived from
(a) a poly(oxy C$_{2-4}$ alkylene) diol having at least about 50% by weight of oxyethylene groups and a nominal number average molecular weight of about at most 1100, said diol having nominally two hydroxyl equivalents per mole,
(b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and
(c) a monomeric polyol cross-linking agent having 3 or 4 hydroxyl equivalents per mole,
said isocyanate product comprising more than 50% by weight of the prepolymer,
said diol and polyol cross-linking agent being present in a mole ratio in the range of 4:1 to 8:1, and
the ratio of the isocyanate equivalents to the total hydroxyl equivalents being in the range of 3:1 to 4:1.

2. A foamed sponge according to claim 1, wherein the nominal number average molecular weight of the poly(oxy C$_{2-4}$ alkylene) diol is between 600 and 1100 and the diol has at least 80% by weight of oxyethylene groups.

3. A foamed sponge according to claim 1, wherein the polyol cross-linking agent is selected from the group consisting of trimethylolpropane, trimethylolethane, glycerol, triethanolamine, pentaerythritol, and mixtures thereof.

4. A foamed sponge according to claim 3, wherein the polyol cross-linking agent is trimethylolpropane.

5. A foamed sponge according to claim 1, wherein the aqueous phase further comprises a surfactant.

6. A foamed sponge according to claim 5, wherein the surfactant is a diol made by capping poly(oxypropylene) of molecular weight of about 1750 with ethylene oxide such that the resultant liquid product contains about 20% by weight of ethylene oxide.

7. A foamed sponge according to claim 1, further comprising reinforcing fibers.

8. A foamed sponge according to claim 7, wherein the reinforcing fibers are polyester fibers of a length of about ¼ inch or less.

9. A foamed sponge according to claim 8, further comprising a thickening or suspending agent.

10. A foamed sponge according to claim 9, wherein the thickening or suspending agent is a high molecular weight polycarboxylic acid.

11. A foamed sponge according to claim 10, wherein the polycarboxylic acid is a polyacrylic acid polymer having an approximate molecular weight of 1,250,000.

12. A foamed sponge according to claim 10, wherein the polycarboxylic acid is neutralized.

13. A foamed sponge according to claim 12, wherein the polycarboxylic acid is neutralized with ammonium hydroxide.

14. A prepolymer, for use in making a foamed sponge, comprising the reaction product of
(a) a poly(oxy $C_{2-4}$ alkylene) diol having at least about 50% by weight of oxyethylene groups and a nominal number average molecular weight of about at most 1100, said diol having nominally two hydroxyl equivalents per mole,
(b) a diphenylmethane diisocyanate-containing isocyanate product with a functionality of greater than 2.0 comprising a mixture of a major amount of pure diphenylmethane diisocyanate and minor amounts of carbodiimides and trifunctional cycloadducts of diphenylmethane diisocyanate, and
(c) a monomeric polyol cross-linking agent having 3 or 4 hydroxyl equivalents per mole,
said isocyanate product comprising more than 50% by weight of the prepolymer,
said diol and polyol cross-linking agent being present in a mole ratio in the range of 4:1 to 8:1, and
the ratio of the isocyanate equivalents to the total hydroxyl equivalents being in the range of 3:1 to 4:1.

15. A prepolymer according to claim 14, wherein the molecular weight of the poly(oxy $C_{2-4}$ alkylene) diol is between 600 and 1100 and the diol has at least 80% by weight of oxyethylene groups.

16. A prepolymer according to claim 15, wherein the polyol cross-linking agent is selected from the group consisting of trimethylolpropane, trimethylolethane, glycerol, triethanolamine, pentaerythritol, and mixtures thereof.

* * * * *